(12) United States Patent
Taylor et al.

(10) Patent No.: US 10,894,295 B2
(45) Date of Patent: Jan. 19, 2021

(54) ADJUSTABLE COVER FOR AIR RECIRCULATION IN A GENERATOR POWER SUPPLY

(71) Applicant: Illinois Tool Works Inc., Glenview, IL (US)

(72) Inventors: Timothy Dale Taylor, Fond du Lac, WI (US); David Radtke, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 350 days.

(21) Appl. No.: 15/795,919

(22) Filed: Oct. 27, 2017

(65) Prior Publication Data

US 2019/0099824 A1 Apr. 4, 2019

Related U.S. Application Data

(60) Provisional application No. 62/565,778, filed on Sep. 29, 2017.

(51) Int. Cl.
*B23K 9/10* (2006.01)
*F02B 63/04* (2006.01)
*F01P 7/02* (2006.01)

(52) U.S. Cl.
CPC .............. *B23K 9/1006* (2013.01); *F01P 7/02* (2013.01); *F02B 63/044* (2013.01); *F01P 2050/00* (2013.01)

(58) Field of Classification Search
USPC ........................ 180/68.6, 61.1, 68.2; 219/133
See application file for complete search history.

(56) References Cited

U.S. PATENT DOCUMENTS 5,472,037 A * 12/1995 Hoffman ................. E05D 7/009
160/118
6,142,108 A 11/2000 Blichmann
(Continued)

FOREIGN PATENT DOCUMENTS

EP 2787190 A1 10/2014

OTHER PUBLICATIONS

PCT International Search Report for International Application No. PCT/US2018/052421 dated Jan. 2, 2019, 12 pages.

*Primary Examiner* — Serkan Akar
*Assistant Examiner* — Spencer H. Kirkwood
(74) *Attorney, Agent, or Firm* — McAndrews, Held & Malloy, Ltd.

(57) ABSTRACT

A welding power supply having an adjustable cover is disclosed. The welding power supply includes an enclosure housing an engine, a porous radiator thermally coupled to the engine, and a fan configured to propel air through the radiator. A ventilation opening is in fluid communication with the fan and radiator. The fan is configured to move heated air along an air path and out of the ventilation opening. The air may be heated by the welding power supply components (e.g. engine, radiator, charge air cooler, oil cooler, compressor, generator, weld circuitry, and/or other components), for example. The adjustable cover is positioned over the ventilation when in a fully closed and/or partially open/closed position. The adjustable cover may be moved between fully closed, partially open/closed, and fully open positions. The amount of air that is allowed to exit the enclosure, and the amount of air that is recirculated within the enclosure, may be altered by adjusting the position of the adjustable cover.

19 Claims, 14 Drawing Sheets

(56) References Cited

U.S. PATENT DOCUMENTS

| | | | | |
|---|---|---|---|---|
| 6,631,310 | B1 * | 10/2003 | Leslie | H02P 9/00 |
| | | | | 700/21 |
| 7,137,428 | B1 * | 11/2006 | Alford | B60J 1/2011 |
| | | | | 160/105 |
| 7,353,765 | B1 * | 4/2008 | Feldman | A62C 3/10 |
| | | | | 114/211 |
| 2006/0098051 | A1 | 5/2006 | Kubota et al. | |
| 2009/0119965 | A1 * | 5/2009 | Broehl | A47G 1/143 |
| | | | | 40/721 |
| 2014/0252777 | A1 * | 9/2014 | White | F02B 63/044 |
| | | | | 290/1 B |
| 2015/0083701 | A1 * | 3/2015 | Burkhart | B23K 9/1006 |
| | | | | 219/133 |
| 2015/0136353 | A1 * | 5/2015 | Niemann | B60K 11/04 |
| | | | | 165/41 |

* cited by examiner ature example welding power supply.

ADJUSTABLE COVER FOR AIR RECIRCULATION IN A GENERATOR POWER SUPPLY

CROSS-REFERENCE TO RELATED APPLICATIONS

The present application claims the benefit of U.S. provisional application 62/565,778 filed Sep. 29, 2017, the entire contents of which are expressly incorporated herein by reference.

TECHNICAL FIELD

The present disclosure relates generally to air recirculation in a welder, and more particularly relates to an adjustable cover for air recirculation in a welder.

BACKGROUND

Engine-generator welding power supplies sometimes encounter issues when operating in colder conditions, such as where ambient temperatures are at, near, or below freezing (i.e. 32° F.; 0° C.). The operating temperature of the engine-generator is not always adequate to prevent engine breather freezing and/or exhaust related issues, such as wet-stacking. Such issues can be detrimental to the operation of a welding system.

SUMMARY

An adjustable cover for air recirculation in a welder is disclosed, substantially as illustrated by and described in connection with at least one of the figures, and as set forth more completely in the claims.

DESCRIPTION OF THE DRAWINGS

These and other advantages of the present disclosure may be readily understood with the reference to the following specifications and attached drawings wherein.

The figures are not necessarily to scale. Where appropriate, the same or similar reference numerals are used in the figures to refer to similar or identical elements.

DETAILED DESCRIPTION

Figure 1:
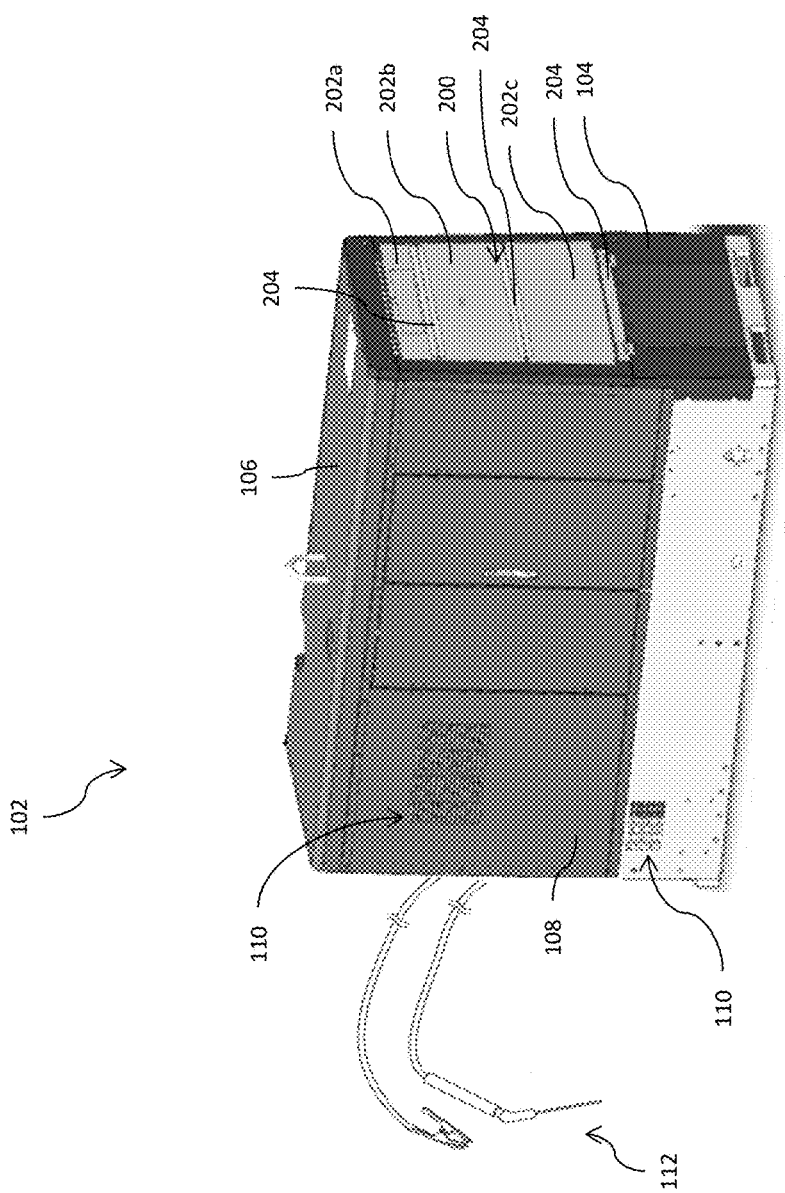
FIG. 1 is a rear perspective view of an example welding power supply.

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein the terms "circuits" and/or "circuitry" refer to physical electronic components (i.e. hardware), such as, for example analog and/or digital components, power and/or control elements, and/or a microprocessor, as well as any software and/or firmware ("code") which may configure the hardware, be executed by the hardware, and or otherwise be associated with the hardware.

As used herein, conversion circuitry refers to circuitry and/or electrical components that convert electrical power from one or more first forms (e.g., power output by a generator) to one or more second forms having any combination of voltage, current, frequency, and/or response characteristics. The conversion circuitry may include safety circuitry, output selection circuitry, measurement and/or control circuitry, and/or any other circuits to provide appropriate features.

As utilized herein, the terms "e.g." and "for example" set off lists of one or more non-limiting examples, instances, or illustrations.

As used herein, the word "approximately," when used to modify or describe a value, means reasonably close to that value.

As used herein, the term "attach" means to affix, couple, connect, join, fasten, link, and/or otherwise secure. As used herein, the term "couple" means to attach, affix, connect, join, fasten, link, and/or otherwise secure. As used herein, the term "connect," means to attach, affix, couple, join, fasten, link, and/or otherwise secure.

As used herein, "operatively coupled" means that a number of elements or assemblies are coupled together, such that as a first element/assembly moves from one position (and/or state, configuration, orientation etc.) to another, a second element/assembly that is operatively coupled to the first element/assembly also moves between one position (and/or state, configuration, orientation etc.) to another. It is noted that a first element may be "operatively coupled" to a second element without the opposite being true.

The term "fluid" refers to a free-flowing deformable substance with no fixed shape, including, inter alia, gas (e.g., air, atmosphere, etc.), liquid (e.g., water), and/or plasma.

Welding-type power, as used herein, refers to power suitable for welding, plasma cutting, induction heating, CAC-A and/or hot wire welding/preheating (including laser welding and laser cladding).

Disclosed example welding power supplies include a generator, an engine operatively coupled to the generator, a radiator thermally coupled to the engine, and an enclosure that houses the generator, engine, and radiator. The enclosure includes a wall having a ventilation opening in fluid communication with the radiator and a cover attached to the wall. The cover may be movable between a closed position in which the cover obstructs at least a portion of the ventilation opening, and an open position in which the cover does not obstruct a portion of the ventilation opening.

In some examples, the ventilation opening is in fluid communication with a ventilation grate, and the ventilation grate includes a plurality of ventilation slots. In some examples, the ventilation grate is spaced from the wall, such that a gap exists between the cover and at least a portion of the ventilation grate when the cover is in the closed position. In some examples, the cover is configured to substantially restrict air from leaving the enclosure through the ventilation slots when the cover is in the closed position. In some examples, at least some of the air is recirculated through the enclosure. In some examples, the cover includes a plurality of panels. In some examples, the plurality of panels includes an upper panel, a middle panel, and a lower panel, and the upper panel moves over the middle panel, and the middle panel moves over the lower panel, when the cover moves from a closed position to an open position. In some examples, the top panel is hingedly attached to the middle panel, and the middle panel is hingedly attached to the lower panel. In some examples, the lower panel is hingedly attached to the wall. In some examples, the welding power supply further includes welding circuitry, and the welding circuitry is configured to modify an electrical signal generated by the generator. In some examples, the enclosure includes an airflow path between the radiator and the ventilation opening. In some examples, the ventilation opening is in fluid communication with an air intake of the enclosure. In some examples, at least a portion of the ventilation opening remains uncovered when the panels are in the closed position.

In some examples, an actuation system moves the cover between open and closed positions in response to a control signal from a controller. In some examples, a temperature sensor is in electrical communication with the controller, and the controller is configured to send a control signal to the actuation system to trigger movement of the cover when the temperature sensor detects an ambient temperature at or within a predetermined threshold. In some examples, the predetermined threshold is above 32 degrees Fahrenheit. In some examples, the predetermined threshold is between 32 degrees Fahrenheit and 15 degree Fahrenheit, inclusive. In some examples, the predetermined threshold is below 15 degrees Fahrenheit. In some examples, the welding power supply further includes an interface configured to receive an input, and the predetermined threshold is set according to the input. In some examples, the welding power supply further includes a transceiver configured to receive communication from an external device, and the predetermined threshold is set according to the received communication.

Disclosed example power supplies include a generator, an engine operatively coupled to the generator, a radiator thermally coupled to the engine, and an enclosure that houses the generator, engine, and radiator. The enclosure includes a wall having a ventilation opening in fluid communication with the radiator and a cover attached to the wall. The cover may be movable between a closed position in which the cover obstructs at least a portion of the ventilation opening, and an open position in which the cover does not obstruct a portion of the ventilation opening.

Disclosed examples involve a welding power supply having an adjustable cover for air recirculation. By recirculating air already heated by welding power supply components (e.g. an engine, radiator, air cooler, oil cooler, compressor, generator, weld circuitry, and/or other components) there is no need for a separate heating system. The recirculated heated air may help to maintain the engine at an appropriate operating temperature, particularly when operating in an environment where surrounding ambient temperatures are low. By maintaining the engine at an appropriate operating temperature, cold weather issues (e.g. engine breather freezing and/or wet stacking) may be reduced and/or prevented.

The adjustable cover may be adjusted between fully closed, partially open/closed, and/or fully open positions. When the recirculation cover is fully closed, a limited amount of heated air is allowed to escape the welding enclosure. Most of the air is recirculated back into the welding enclosure to ensure the engine remains at an acceptable operating temperature. The fully closed configuration may be especially helpful when the welding enclosure is used in particularly cold environments, such as those having an ambient air temperatures below 15° F. (−9° C.), for example. Even when the cover is fully closed, however, some air may still be allowed to escape the welding enclosure.

When the adjustable cover is partially open/closed, a moderate amount of heated air may be allowed to escape the welding enclosure. A moderate portion of the air may be recirculated back into the welding enclosure to ensure the engine temperatures remain at an acceptable level. This configuration may be more appropriate for environments having ambient air temperatures between 15° F. (−9° C.) and 32° F. (0° C.).

When the adjustable cover is fully open, a majority of heated air from the radiator may be allowed to escape. Little to no air may be recirculated back into the welding enclosure to ensure the engine temperatures remain at an acceptable level. This configuration may be better for environments having ambient air temperatures above 32° F. (0° C.).

The adjustable cover may remain substantially attached to the enclosure during operation and/or movement between fully open, partially open/closed, and/or fully open positions. This may be convenient for operators, as they will be spared the hassle of hunting for separated pieces.

FIG. 1 illustrates an example welding power supply 100. The power supply 100 includes an enclosure 102. The enclosure 102 includes a front wall (not shown), a rear wall 104, a top wall 106, a bottom wall (not shown), and sidewalls 108. The sidewalls 108 include louvers 110 that may serve as air intakes to allow air to flow into the enclosure 102. In some examples, the louvers 110 may comprise vents, openings, apertures, holes, and/or other discontinuous voids in the enclosure 102. In some examples, the sidewalls 108 may include additional openings, apertures, holes, etc. through which air may flow. In some examples, the louvers 110 (and/or other openings, apertures, holes, etc.) may be positioned in/on the rear wall 104, and/or the top wall 106, in addition to, or instead of, the sidewalls 108. The front wall may include an interface (not shown) for controlling, manipulating, and/or interacting with the welding power supply 100. A welding-type torch 112 may attach to appropriate outputs of the welding power supply 100 on the front wall of the welding power supply 100. In some examples, the outputs of the welding power supply 100 may be positioned on one or more of a sidewall 108, the rear wall 104, and/or the top wall 106, in addition to, or instead of, being positioned on the front wall of the welding power supply 100.

Figure 2:
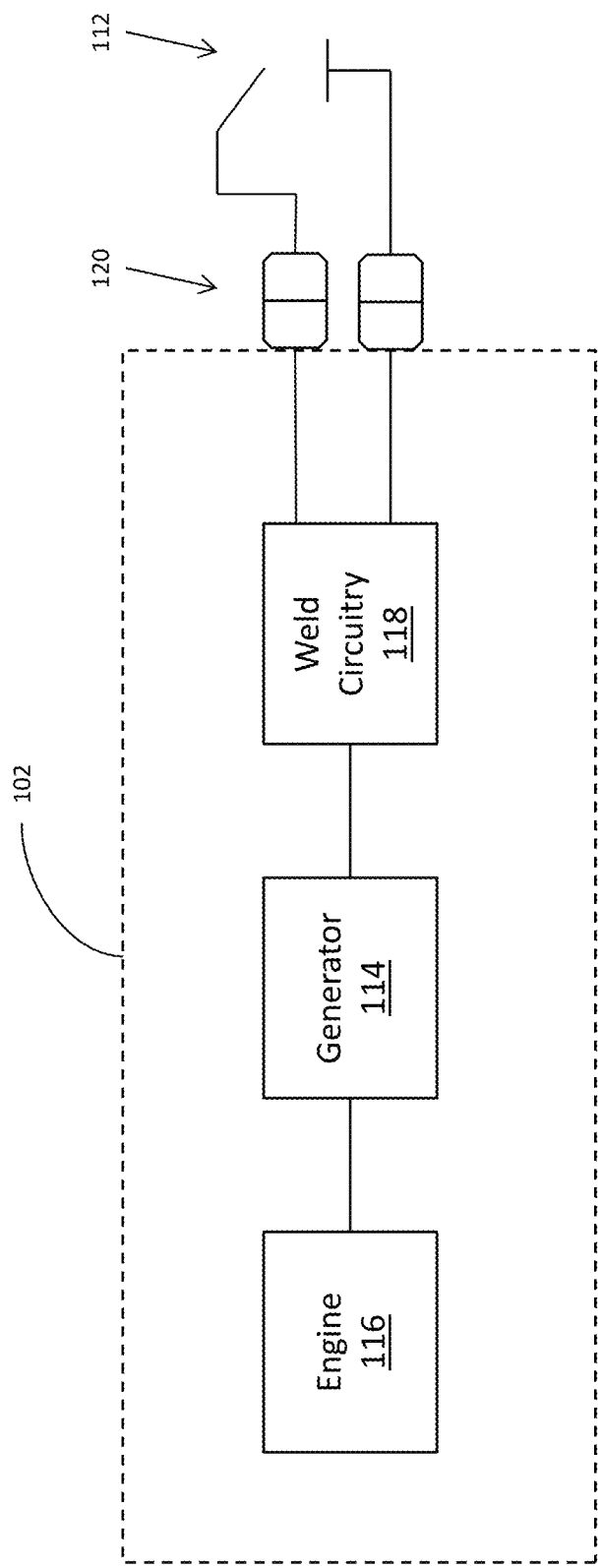
FIG. 2 is a block diagram of the example welding power supply of FIG. 1.

The enclosure 102 houses components of the welding power supply 100. In some examples, the components of the welding power supply 100 may include a generator 114, an engine 116, and/or welding circuitry 118. As shown in FIG. 2, the engine 116 may be operatively coupled to the generator 114. The welding conversion circuitry 118 may also be operatively coupled to the generator 114. The welding conversion circuitry 118 may include transformer-rectifiers, inverters, converters, resonant power supplies, quasi-resonant power supplies, switch-mode power supplies, etc., as well as control circuitry and other ancillary circuitry associated therewith. The welding conversion circuitry 118 may be mounted on circuit boards and/or other retainers, and coupled to the enclosure 102 by brackets and/or supports, for example, and/or otherwise coupled to the enclosure 102. The welding conversion circuitry 118 may convert alternating current (AC) and/or direct current (DC) electrical power received from the generator 114 to welding-type power usable by a welding-type torch 112.

The generator 114 may serve as an electrical power source. The generator 114 may be driven by the engine 116 to generate electrical power. More particularly, the engine 116 may produce mechanical power which the generator 114 then converts into electrical power. The generator 114 may output electrical power as AC or DC electrical power. The generator 114 may be configured to output electrical power in a variety of voltage ranges. The welding conversion circuitry 118 may be operatively coupled to the generator 114. Electrical power may be conducted from the generator 114 to the welding conversion circuitry 118.

The welding-type torch 112 may attach to appropriate outlets 120 of the welding power supply 100. In some examples, the outlets 120 may be positioned in and/or on the front wall of the welding power supply 100. In some examples, the outlets 120 may be positioned in and/or on a sidewall 108, the top wall 106, and/or the rear wall 104. The outlets 120 may be operatively coupled to the welding converter circuitry 118. The welding-type torch 112 may be a torch suitable for gas metal arc welding (GMAW), flux cored arc welding (FCAW), shielded metal arc welding (SMAW), gas tungsten arc welding (GTAW), and/or any other arc welding tool. Alternatively, or additionally, the welding-type torch 112 may be some other device for welding, plasma cutting, induction heating, CAC-A and/or hot wire welding/preheating. The welding-type torch 112 may be electrically coupled to the welding conversion circuitry 118 via the outlets 120, such as through one or more conductors, cables, wires, lines, leads, and/or other electrical connections.

Figure 3:
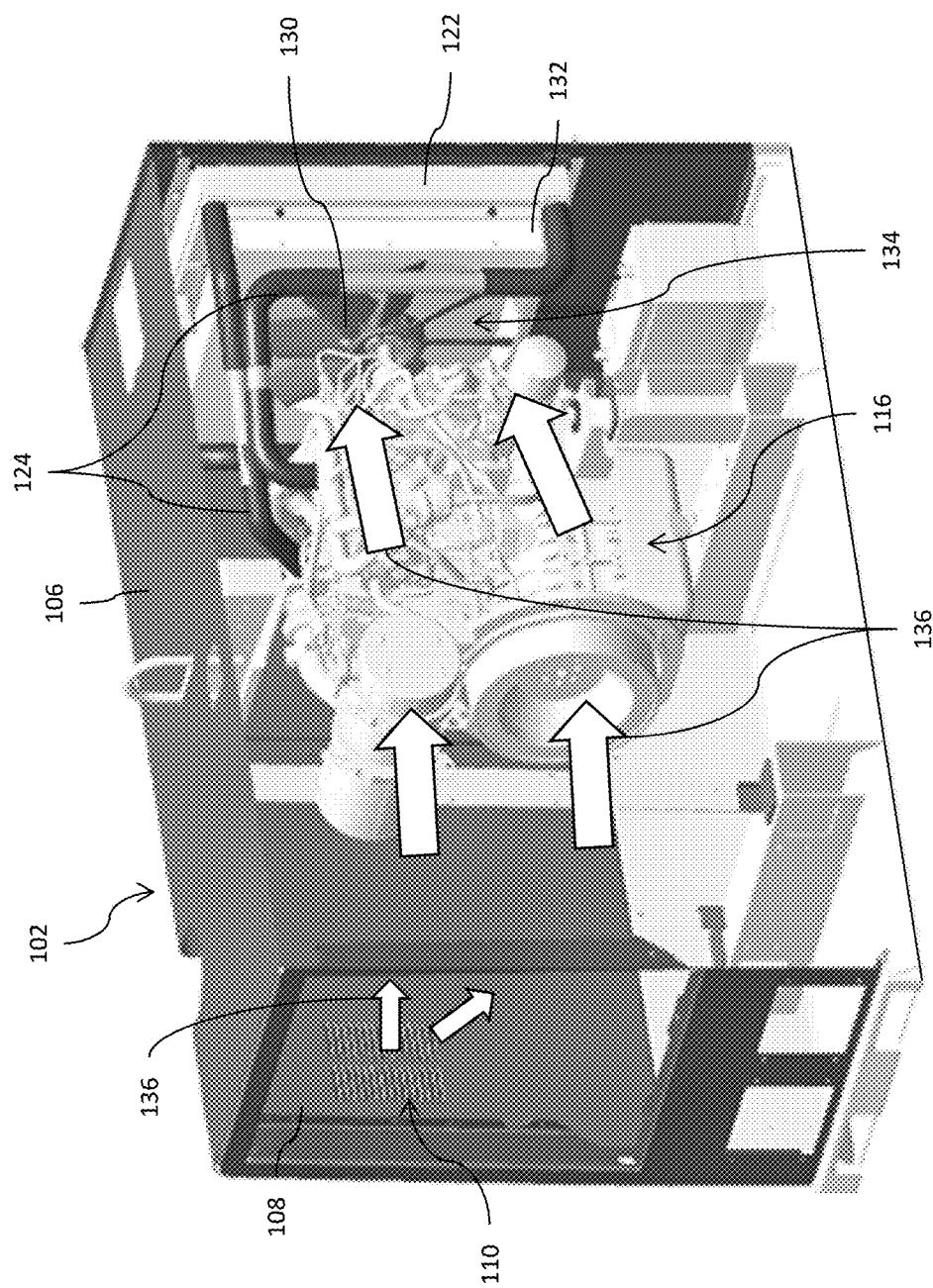
FIG. 3 is a front perspective view of the example welding power supply of FIG. 1 with a sidewall, front wall, generator, fuel tank, and welding circuitry removed.
Figure 4:
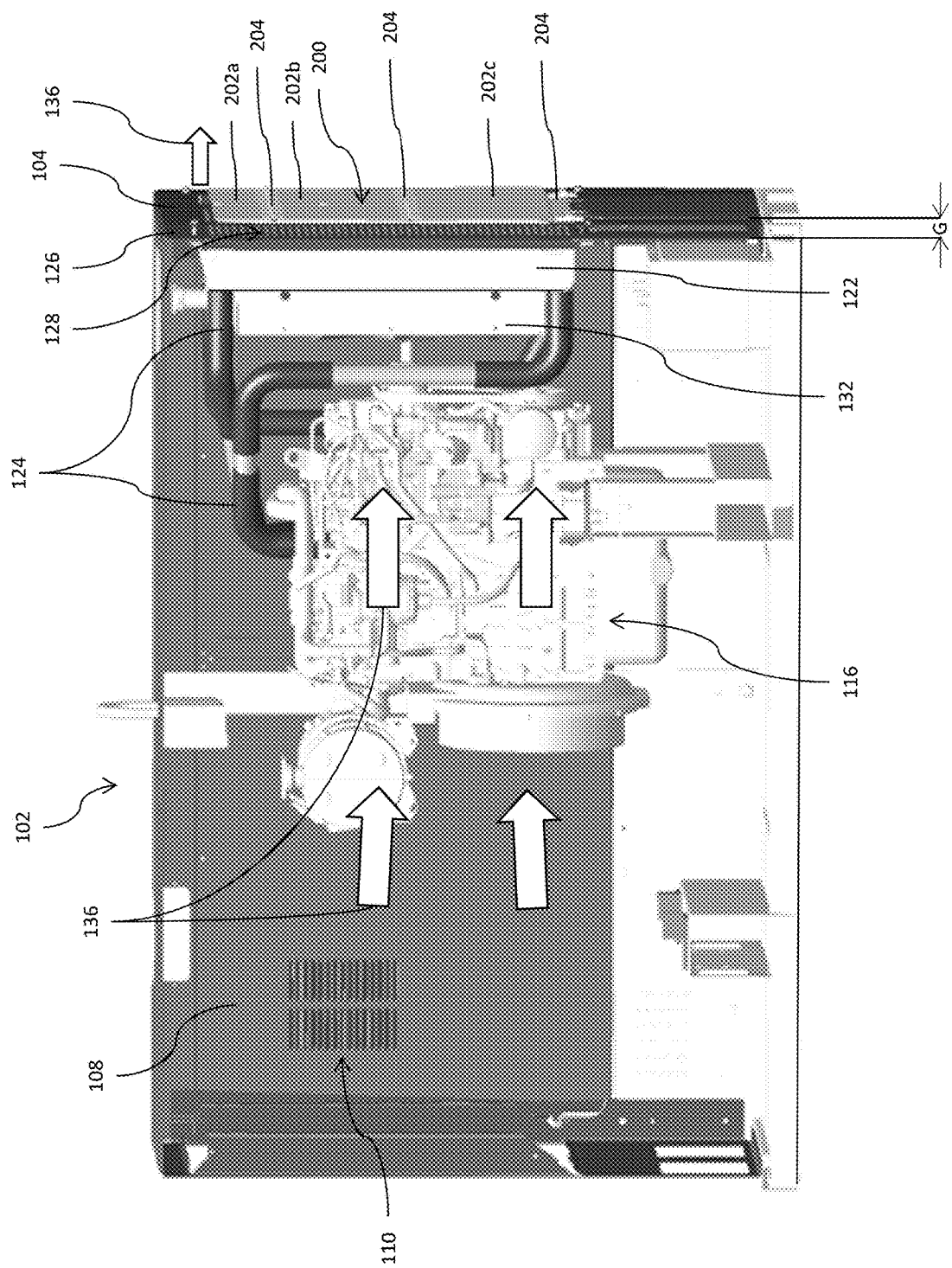
FIG. 4 is a side view of the example welding power supply of FIG. 1 with a sidewall, front wall, generator, fuel tank, and welding circuitry removed.

As shown in FIGS. 3 and 4, the engine 116 is retained within the enclosure 102. The engine 116 may be retained within the enclosure 102 by structural supports, for example. The engine 116 may be an internal combustion engine, for example, such as a diesel engine, for instance. The engine 116 may be in fluid communication with a fuel tank (not shown). The fuel tank may also be retained within the enclosure 102. The generator 114, fuel tank, welding conversion circuitry 118, and/or other components may be omitted from certain figures to avoid clutter and facilitate understanding of the disclosure.

The engine 116 is thermally coupled to (and/or in thermal communication with) a radiator 122 via hoses (and/or pipes, tubes) 124. The hoses 124 are configured to carry coolant (e.g. air, water, oil, and/or other fluid) to and/or from the engine 116 so as to cool the engine, conduct heat away from the engine 116, and/or otherwise dissipate heat produced by the welding power supply 100 components (e.g. engine 116, radiator 122, charge air cooler, oil cooler, compressor, generator 114, weld circuitry 118, and/or other components). The radiator 122 is mounted to a ventilation plate 126. In some examples, the radiator 122 may be integrated with and/or in thermal communication with an oil cooler and/or a charge air cooler (not shown). A grate 128 of the ventilation plate 126 is configured to have a two dimensional area that is approximately equal to the two dimensional area of the radiator 122 that is positioned adjacent to the ventilation plate 126. In other examples, the two dimensional areas of the grate 128 and/or ventilation plate 126 may be substantially different. The radiator 122 is configured to dissipate the heat it conducts from the engine 116 into the air. The radiator 122 is porous, such that air may pass through the radiator 122.

A fan 130 is mounted adjacent to the radiator 122, as shown, for example, in FIG. 3. In some examples, the fan 130 may be powered by the generator 114, the engine 116, and/or by another power source, such as a battery, for example. The fan 130 is mounted within a fan housing 132. The fan housing 132 is positioned adjacent to the radiator 122 and is mounted to the radiator 122. The fan housing 132 includes an orifice 134, in which the fan 130 is mounted and through which air may pass. The orifice 134 is in fluid communication with the pores of the radiator that allow air to pass through the radiator 122.

Figure 5:
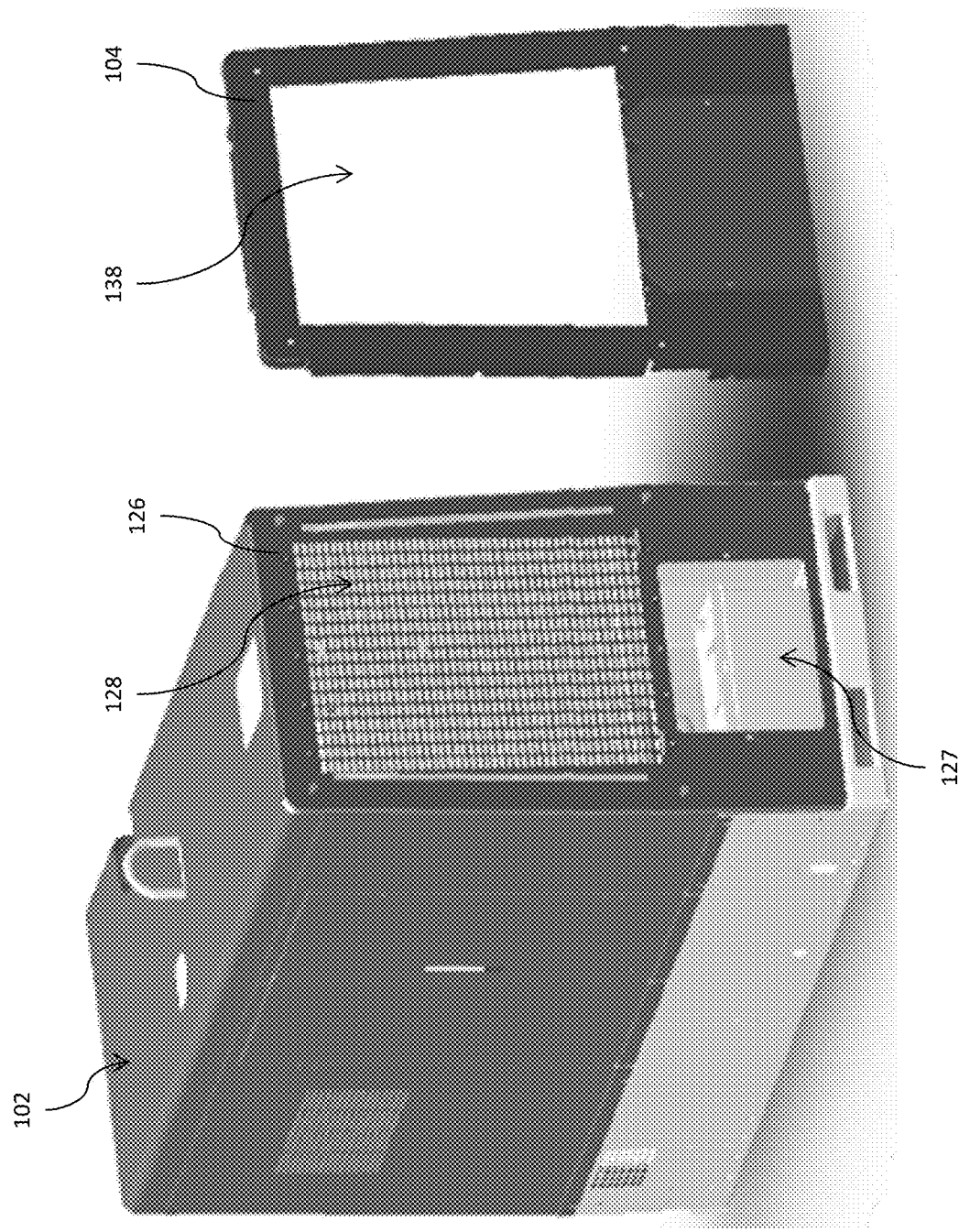
FIG. 5 is a rear perspective view of the example welding power supply of FIG. 1 with a rear wall separated from the enclosure and an adjustable cover removed.

The rear wall 104 of the welding enclosure 102 includes a ventilation opening 138, as shown, for example, in FIG. 5. The ventilation opening 138 is configured for heated air to exit the enclosure 102. The air may be heated by the welding power supply 100 components (e.g. an engine, radiator, charge air cooler, oil cooler, compressor, generator, weld circuitry, and/or other components), for example. As may be seen in FIGS. 4 and 5, a ventilation plate 126 is positioned within the enclosure 102, adjacent to and/or spaced from the ventilation opening 138 and rear wall 104. The ventilation plate 126 includes a perforated grate 128 with a plurality of ventilation slots. The ventilation opening 138 is sized to have approximately the same two dimensional area as the grate 128. In other examples, the ventilation opening 138 may be sized to have a substantially different two dimensional area as the grate 128. The ventilation plate 126 also includes a recirculation opening 127 at a lower portion of the plate 126 to allow air blocked by the adjustable cover to be recirculated through the enclosure. A gap G exists between the ventilation plate 126 and the rear wall 104 to allow air to flow from the ventilation grate 128 down to the recirculation opening 127.

In some examples, the grate 128 may be replaced with a screen, a netting, a mesh, a porous fabric, and/or some other filtering partition. In some examples, the grate 128 may be removed entirely. In some examples, the perforations/slots of the grate 128 may be larger or smaller. In some examples, the grate 128 may comprise a plurality of connected grates (and/or screens, nettings, mesh, porous fabrics, etc.).

An airflow path 136 exists between the louvers 110 (and/or other openings, apertures, holes, etc. (not shown)) integrated in the sidewall 108 of the enclosure 102 and the ventilation opening 138 in the rear wall 104 of the enclosure. The louvers 110 (and/or other openings, apertures, holes, etc. (not shown)) may serve as air intakes to the airflow path 136. The airflow path 136 extends adjacent to the engine 116, through orifice 134 of the fan housing 132, through the porous radiator 122, and through the ventilation grate 128 and ventilation opening 138. The airflow path 136 may allow for fluid communication between the engine 116, fan 130, radiator 122, ventilation grate 128, ventilation opening 138, and/or (depending on the position of the adjustable cover 200) the recirculation opening 127. The fan 130 is configured to move air along the airflow path 136. As the air moves along the airflow path 136, it may be heated by the thermal energy created by and/or conducted through the welding power supply 100 components (e.g. engine 116, radiator 122, charge air cooler, oil cooler, compressor, generator 114, weld circuitry 118, and/or other components). The propelled air may pick up heat from the welding power supply 100 components, and carry the heat with it as it flows through and/or out of the enclosure 102. The air that is blocked by the adjustable cover 200 may recirculate the heat back through the enclosure 102 via the recirculation opening 127.

As shown in FIG. 1, the adjustable cover 200 is attached to the rear wall 104 of the enclosure 102 over most of the ventilation opening 138 when in the fully closed position. When in the fully closed position, the cover 200 substantially blocks and/or obstructs air flow propelled by the fan 130 along the air path 136 from leaving the enclosure 102 through the ventilation opening 138. A small portion of the ventilation opening 138 may still be exposed when the cover 200 is in the fully closed position, so some air may still able to exit the enclosure 102 through the ventilation opening 138. However, in the fully closed position, most (if not all) of the air propelled by the fan 130 is blocked by the adjustable cover 200 from exiting the enclosure 102 through ventilation opening 138. The blocked air is redirected downwards through the gap G between the ventilation plate 126 and the rear wall 104, and towards the interior of the enclosure 102 through the recirculation opening 127. Thus, in colder conditions, for example, the cover 200 may be closed so as keep the inside of the enclosure 102 warm with recirculated (and/or recycled) air.

In some examples, the cover 200 comprises a plurality of panels 202. As shown, for example, in FIGS. 1 and 4, the cover 200 may comprise three panels 202a, 202b, and 202c. In some examples, the cover 200 may include more or less panels 202, such as one or two panels, four to six panels, or a dozen panels, for example. In some examples, the cover 200 and/or panels 202 may be made of formed, extruded, and/or cut metals, polymers, vinyl, cloth, composites, and/or any other appropriate material and/or combination of materials. In the example shown in FIGS. 1 and 4, the panels 202 are connected to one another at hinges 204, such that the panels 202 may fold down over one another. At least the lower most panel 202c may be attached to the rear wall 104 via a hinge 204 as well. In some examples, the panels 202 may connect with each other and/or the enclosure 102 using an extruded/interlocking connection, screws, bolts, magnets, fabric hook and loop fasteners (i.e. Velcro®), adhesive, ties, a ratchet tie down, a bungee tie down, and/or other mechanical fastening techniques.

Figure 6B:
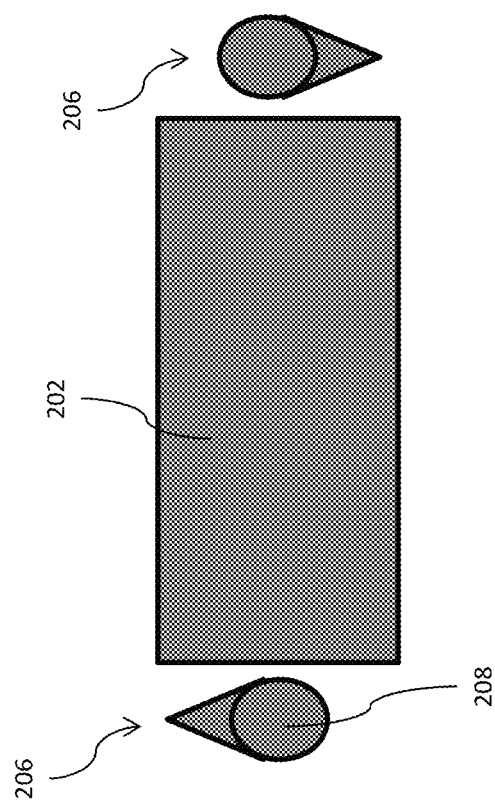
FIGS. 6a and 6b illustrate operation of a cover panel retaining clip.
Figure 6A:
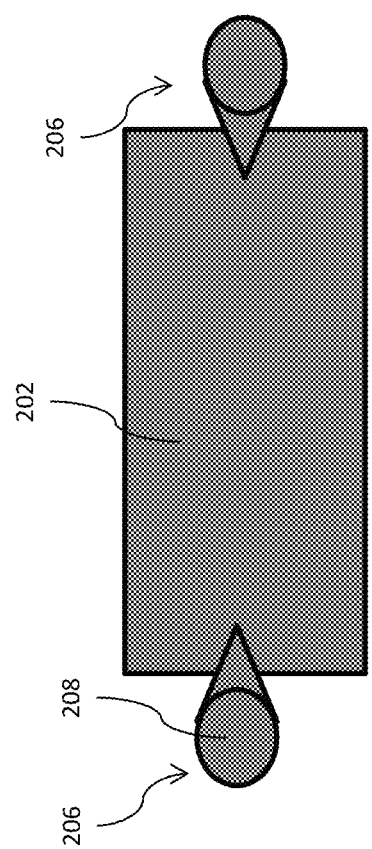

As shown in FIGS. 6a and 6b, the panels 202 may be retained in their upright position by rotatable clips 206. Each panel 202 may have a corresponding pair of rotatable clips 206, with one on each side of the panel 202. In some examples, each panel 202 may have more than two clips 206, such as, for example, three clips 206, four clips 206, eight clips 206, twelve clips 206, etc. Each rotatable clip 206 may be attached to the enclosure 102 at a pivot point 208, such that the clip 206 may rotate and/or pivot about the pivot point 208. The clip 206 may be configured for up to 360 degrees of rotation. When the clip 206 is rotated to a locking position, such that the clip 206 is positioned over the panel 202, as shown for example in FIG. 6a, then the clip 206 impinges upon the panel 202 and retains that particular panel 202 in a closed position. The clip 206 may be rotated away from the panel 202 to an unlocked position, where the clip 206 does not impinge upon the panel 202, such as shown in FIG. 6b. When the clip 206 is positioned is an unlocked position, the panel 202 is free to rotate about its hinge 204 to an open position. The use of rotatable clips 206 and hinges 204 allows an operator to adjust the cover 200 without the use of any tools. It also allows the cover 200 to maintain attachment to the enclosure 102 when in a fully open position, so that an operator does not have to worry about losing the cover 200 and/or any panel 202 pieces of the cover 200.

In some examples, the rotatable clips 206 may be replaced by screws, bolts, magnets, fabric hook and loop fasteners (i.e. Velcro®), adhesive, ties, a ratchet tie down, a bungee tie down, and/or other mechanical fastening techniques. In some examples, the panels 202 may be attached to the rear wall 104 and/or each other via other methods, such as, for instance, adhesive, hooks, magnets, fabric hook and loop fasteners (i.e. Velcro®), screws, bolts, ties, a ratchet tie down, a bungee tie down, and/or other mechanical fastening techniques. In some examples, the panels 202 may be slidably connected to the rear wall 104 via tracks. In some examples, the panels 202 may be removeably attached to the rear wall 104 and/or each other. In some examples, the cover 200 may operate like blinds or shutters, with each panel 202 configured to rotate from a closed position substantially planar and/or parallel with the rear wall 104, to a position substantially perpendicular and/or angled with respect to the rear wall 104.

The cover 200 is configured to move between a fully closed position, where most of the ventilation opening 138 and/or ventilation grate 128 is obstructed (and/or blocked, impeded, inhibited, hampered, plugged, etc.) by the cover 200, and a fully open position where little to none of the opening 138 and/or ventilation grate 128 is obstructed by the cover 200. While transitioning from the fully open position to the fully closed position, and/or vice versa, the cover 200 may move to one or more intermediately and/or partially open/closed position, where some and/or a moderate amount of the ventilation opening 138 and/or ventilation grate 128 is obstructed by the cover 200 and/or some and/or a moderate amount of the ventilation opening 138 and/or ventilation grate 128 is not obstructed by the cover 200.

Each panel 202 of the cover 200 is also configured to move between a closed position and an open position. In a closed position, a panel 202 obstructs a portion of the ventilation opening 138 and or ventilation grate 128 adjacent to that particular panel 202. In an open position, a panel 202 obstructs little to none of the ventilation opening 138 and or ventilation grate 128. When in an open position, a panel 202 may lie adjacent to another panel 202 that is in a closed or open position. As the cover 200 moves from a fully closed position to a fully open position, and/or vice versa, the panels 202 of the cover may also move from closed positions to open positions, and/or vice versa. Thus, when the cover 200 is in a fully closed position, all the panels 202 of the cover 200 are in a fully closed position. When the cover 200 is in a fully open position, all the panels 202 of the cover are in a fully open position. When the cover 200 is in a partially open position, some of the panels 202 are in a closed position, while others are in an open position.

Figure 7B:
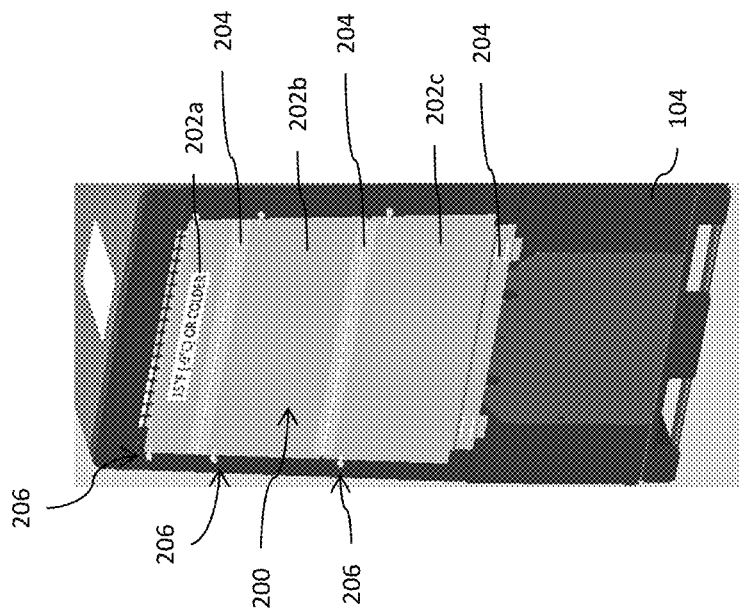
FIGS. 7a and 7b illustrate operation of the example welding power supply of FIG. 1 when the cover is in a fully closed position.
Figure 7A:
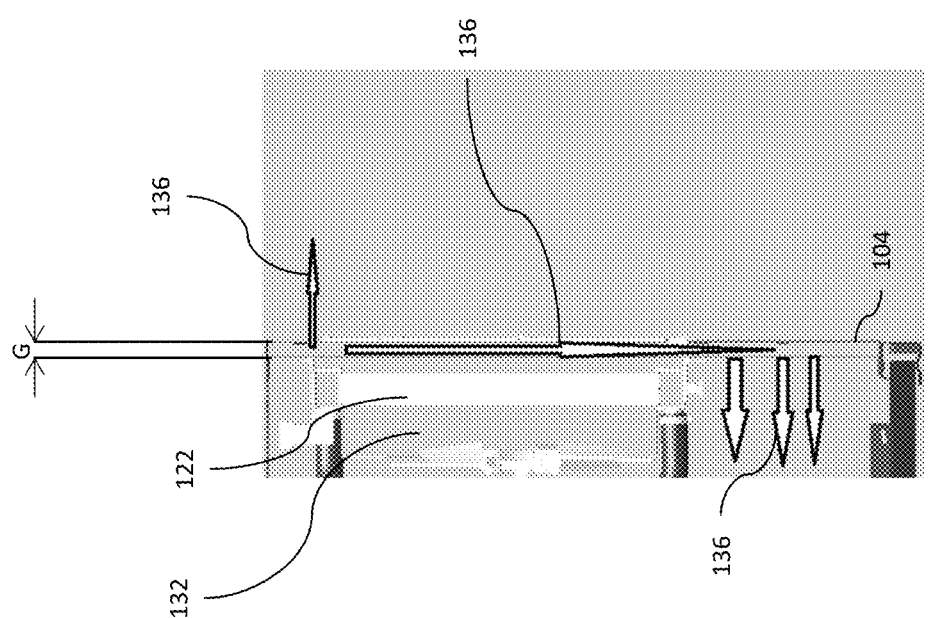

FIGS. 7a through 9b illustrate a transition of the cover 200 from a fully closed position to a fully open position. FIG. 7b shows the cover 200 in a fully closed position. All the panels 202 are in their closed position. The clips 206 are in their locked position, impinging upon the panels 202. Only a small sliver of the ventilation grate 128 and its ventilation slots are exposed and/or in fluid communication with the ventilation opening 138 and/or the outside air. Most of the ventilation grate 128, ventilation slots, and ventilation opening 138 is obstructed by the cover 200 and its panels 202. Thus, as shown in FIG. 7a, only a small amount of air is able to escape the enclosure 102 through the ventilation grate 128 and/or ventilation opening 138. Most of the air is redirected down through the gap G and recirculated back into the enclosure 102 through the recirculation opening 127.

Figure 8B:
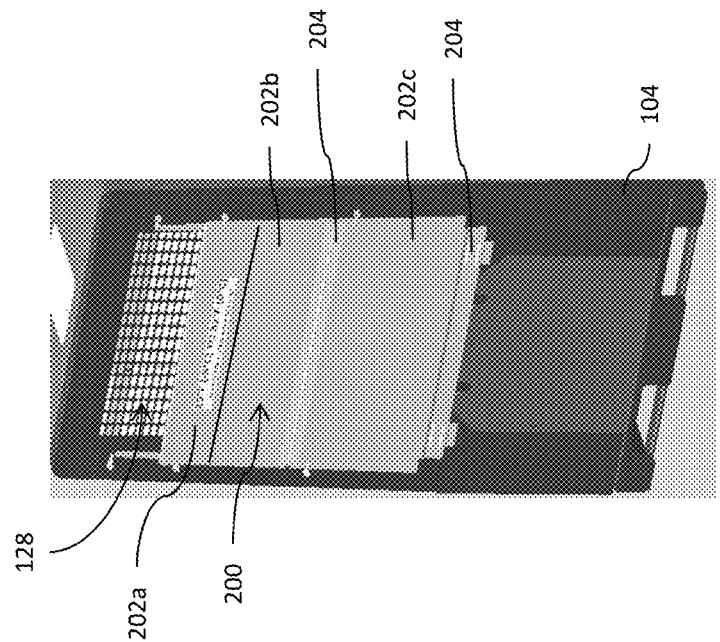
FIGS. 8a and 8b illustrate operation of the example welding power supply of FIG. 1 when the cover is in a partially open/closed position.
Figure 8A:
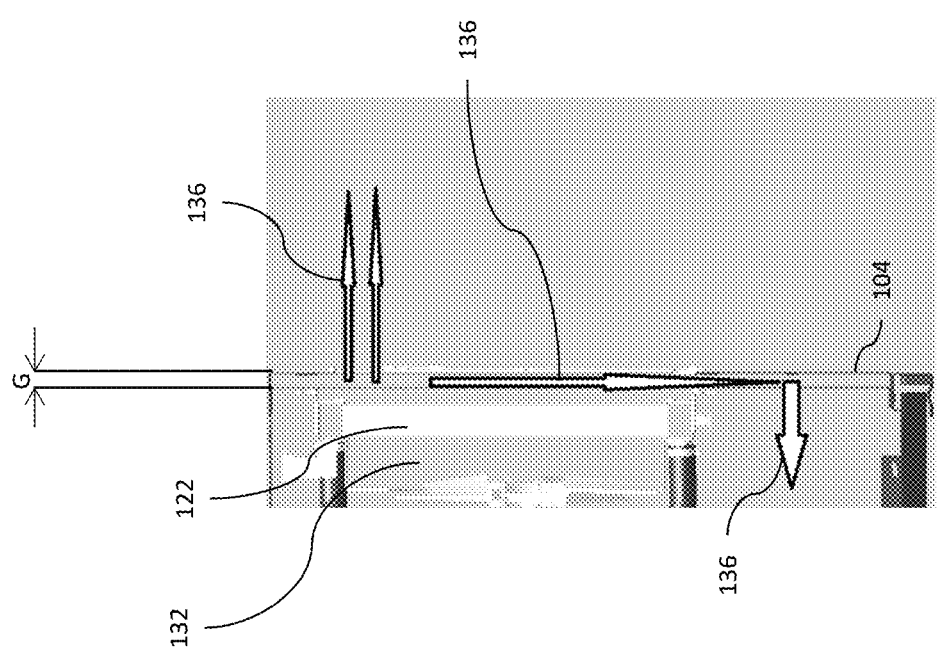

FIGS. 8a and 8b show the cover 200 in a partially open/closed position. The clips 206 of the top panel 202a may be rotated to their unlocked position to allow the panel 202a to rotate about its hinge 204 to an open position. The top panel 202a lies atop the middle panel 202b. Both the middle panel 202b and lower panel 202c remain in their closed positions, with their clips 206 in their locked position. Some of the ventilation grate 128 and its ventilation slots are exposed and/or in fluid communication with the ventilation opening 138 and/or the outside air. Some of the ventilation grate 128, ventilation slots, and/or ventilation opening 138 is obstructed by the cover 200 and its panels 202. Thus, as shown in FIG. 8a, a moderate amount of air is able to escape the enclosure 102 through the ventilation grate 128 and/or ventilation opening 138. Still, some of the air is redirected down through the gap G and recirculated back into the enclosure 102 through the recirculation opening 127. While there is no figure illustrating the cover 200 in a second partially open/closed position, with the middle panel 202b and top panel 202a in open positions, persons of ordinary skill in the art will be able to extrapolate upon the provided figures to understand the operation of the system in such a situation.

Figure 9B:
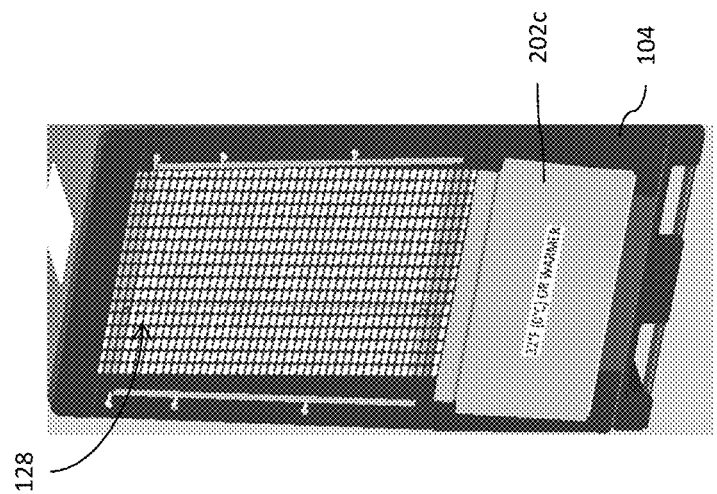
FIGS. 9a and 9b illustrate operation of the example welding power supply of FIG. 1 when the cover is in a fully open position.
Figure 9A:
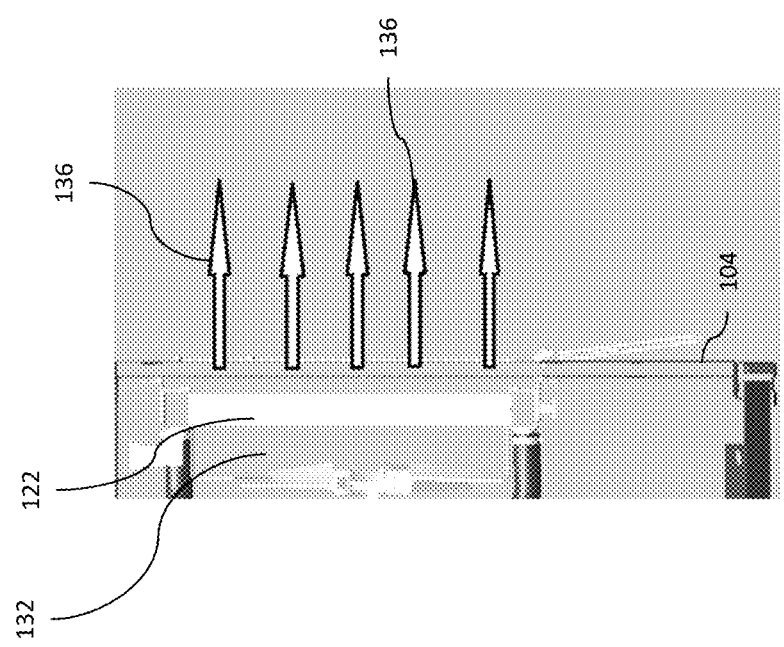

FIGS. 9a and 9b show the cover 200 in a fully open position. All the panels 202 are in the open position. The bottom panel 202c has been folded down over the top panel 202a and middle panel 202b. All or the vast majority of the ventilation grate 128 and its ventilation slots are exposed and/or in fluid communication with the ventilation opening 138 and/or the outside air. Little to none of the ventilation grate 128, ventilation slots, and ventilation opening 138 is obstructed by the cover 200 and its panels 202. Thus, as shown in FIG. 9c, all or a vast majority of the air is able to escape the enclosure 102 through the ventilation grate 128 and/or ventilation opening 138. Little to none of the air is redirected down through the gap G and recirculated back into the enclosure 102 through the recirculation opening 127.

Figure 10:
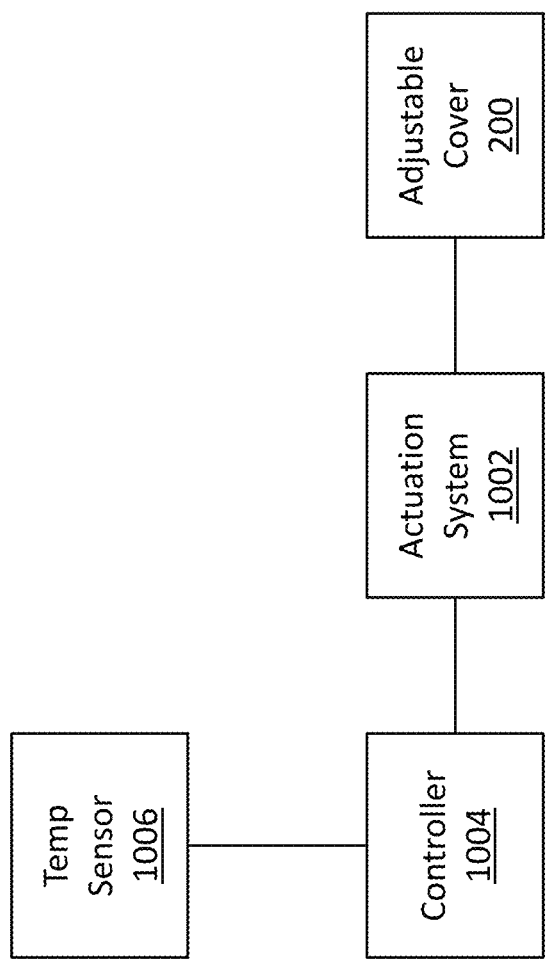
FIG. 10 is a block diagram illustrating additional components of the example welding power supply of FIG. 1.

In some examples, the cover 200 and/or the panels 202 of the cover 200 may be coupled to an actuation system 1002, as shown, for example, in FIG. 10. The actuation system 1002 may, for example, be a motorized system configured to move the cover 200 and/or each panel 202 of the cover 200 between a fully closed position and a fully open position, and/or vice versa. The actuation system 1002 may include a drive train and/or a mechanical linkage to assist with movement of the cover 200 and/or panels 202.

In some examples, the actuation system 1002 may be configured to move the cover 200 and/or panels 202 between the fully open, partially open/closed, and fully closed positions, and/or vice versa, in response to a control signal from a controller 1004, for example. In some examples, the controller 1004 may comprise a simple on/off switch that an operator may activate. In such an example, the controller 1004 may trigger movement of the cover 200 between fully open, partially open/closed, and fully closed positions via the actuation system 1002 in response to the switch being turned on and/or off. In some examples, the switch may be a bit more complicated, with one or more intermediate options, states, and/or positions corresponding to the partially open/close positions of the cover 200, in addition to one or more options, states, and/or positions corresponding to the fully open and closed positions.

In some examples, the controller 1004 may be electrically coupled to a temperature sensor 1006. The temperature sensor 1006 may be attached to and/or positioned in and/or on the enclosure 102. The temperature sensor 1006 may be configured to measure, detect, and/or sense an ambient temperature of the environment in, near, and/or around the enclosure 102. The controller 1004 may be configured to send a control signal to the actuation system 1002 triggering movement of the cover 200 in response to particular measurements by the temperature sensor 1006. In some examples, the controller 1004 may be configured to send a control signal to the actuation system 1002 triggering movement of the cover 200 to a fully open position in response to the temperature sensor 1006 measuring ambient air temperatures at and/or above freezing (i.e. 32° F.; 0° C.). In some examples, the controller may be configured to send a control signal to the actuation system 1002 triggering movement of the cover 200 to a partially open/closed position in response to the temperature sensor 1006 measuring ambient air temperatures between 15° F. (−9° C.) and 32° F. (0° C.). In some examples, the controller may be configured to send a control signal to the actuation system 1002 triggering movement of the cover 200 to a fully closed position in response to the temperature sensor 1006 measuring ambient air temperatures at and/or below 15° F. (−9° C.).

In some examples, the controller 1004 may comprise a processor and/or other electrical and/or computer circuitry that is configured to perform more advanced logical and/or mathematical operations. In some examples, the controller 1004 may include and/or be operatively coupled to an interface configured to receive input from an operator. For example, the interface may be configured to receive an input temperature and/or a temperature range for which the controller 1004 may trigger a particular operation, such as a transition of the cover 200 to a fully open and/or closed position and/or a partially open and/or closed position. In some examples, the interface may be configured to receive input from an operator specifying a time to transition the cover 200 to a fully open and/or closed position and/or a partially open and/or closed position. In some examples, the interface may be configured to receive input from an operator specifying a time limit to wait before transitioning the cover 200 to a fully open and/or closed position and/or a partially open and/or closed position. In some examples, the controller 1004 may include a wired and/or wireless transmitter, receiver, and/or transceiver through which the controller 1004 may send and/or receive communications to/from an external device. Such communications may, for example, include data comprising a temperature and/or a temperature range for which the controller 1004 may trigger a particular operation, such as a transition of the cover 200 to a fully open and/or closed position and/or a partially open and/or closed position. In some examples, the communications may comprise a command to immediately transition the cover 200 to a fully open and/or closed position and/or a partially open and/or closed position. In some examples, the communications may comprise a command to transition the cover 200 to a fully open and/or closed position and/or a partially open and/or closed position at a specified time or after a specified time.

In operation, the cover 200 of the power supply 100 may be adjusted as necessary to achieve an appropriate and/or desired level of ventilation and/or recirculation. By recirculating air already heated by welding power supply 100 components (e.g. engine 116, radiator 122, charge air cooler, oil cooler, compressor, generator 114, weld circuitry 118, and/or other components), there is no need for a separate heating system. The heated recirculated air may help to maintain the engine 116 at an appropriate operating temperature, particularly when ambient temperatures in the surrounding environment are low. By maintaining the engine 116 at an appropriate operating temperature, cold weather issues (e.g. engine breather freezing and wet stacking) may be reduced and/or prevented.

Figure 11A:
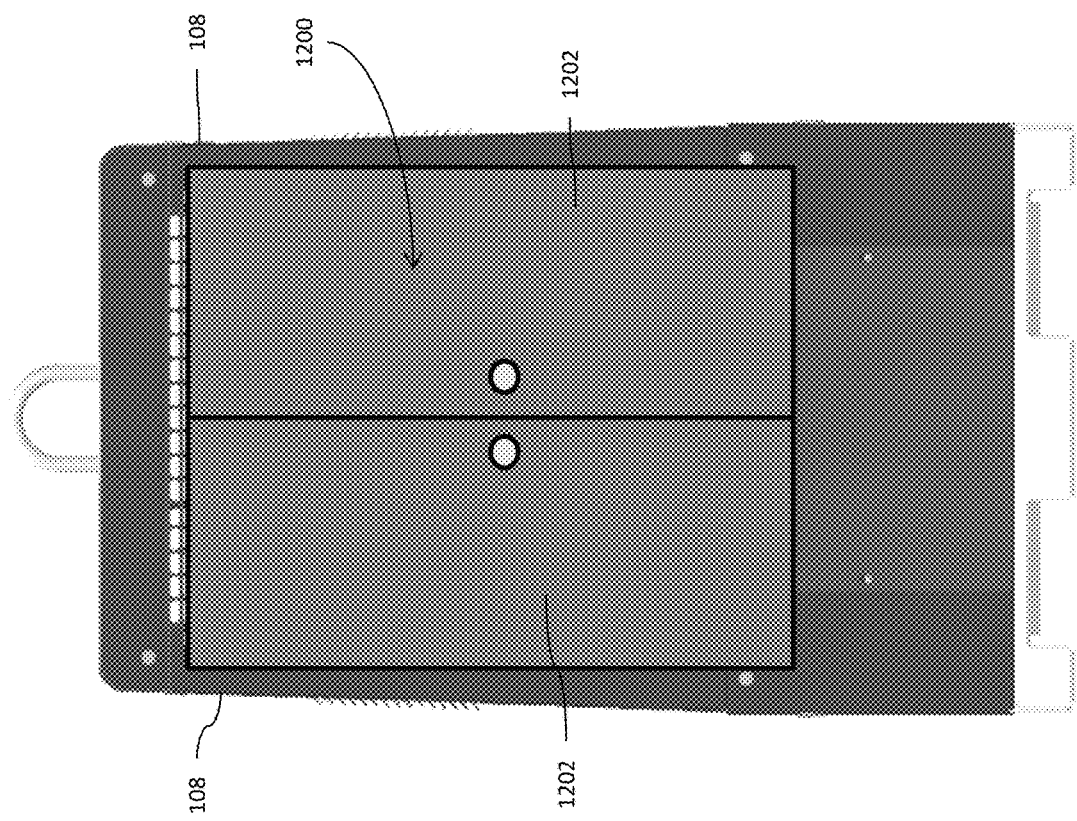
FIGS. 11a through 11c illustrate a rear view of an alternative example welding power supply.
Figure 11B:
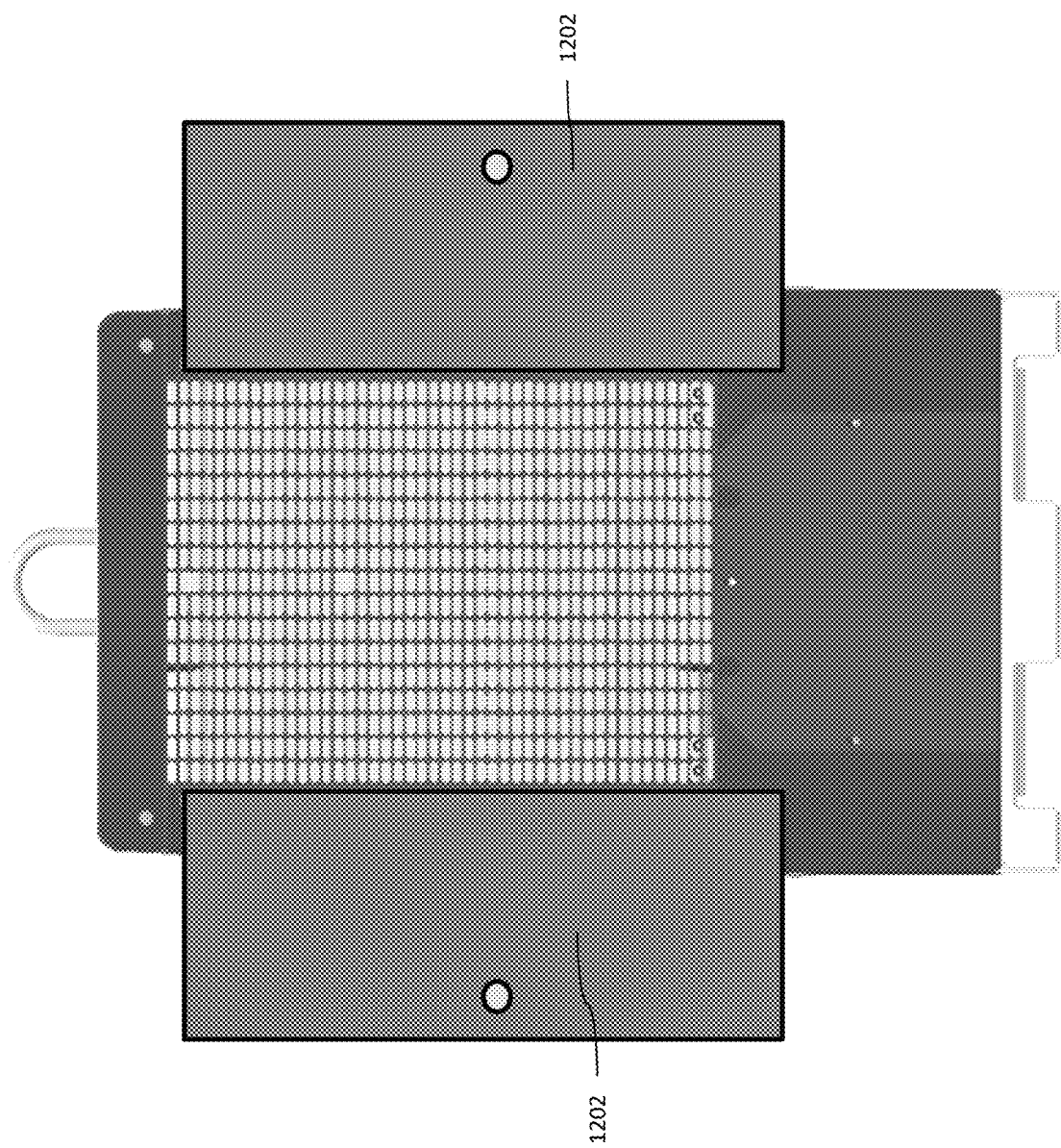
Figure 11C:
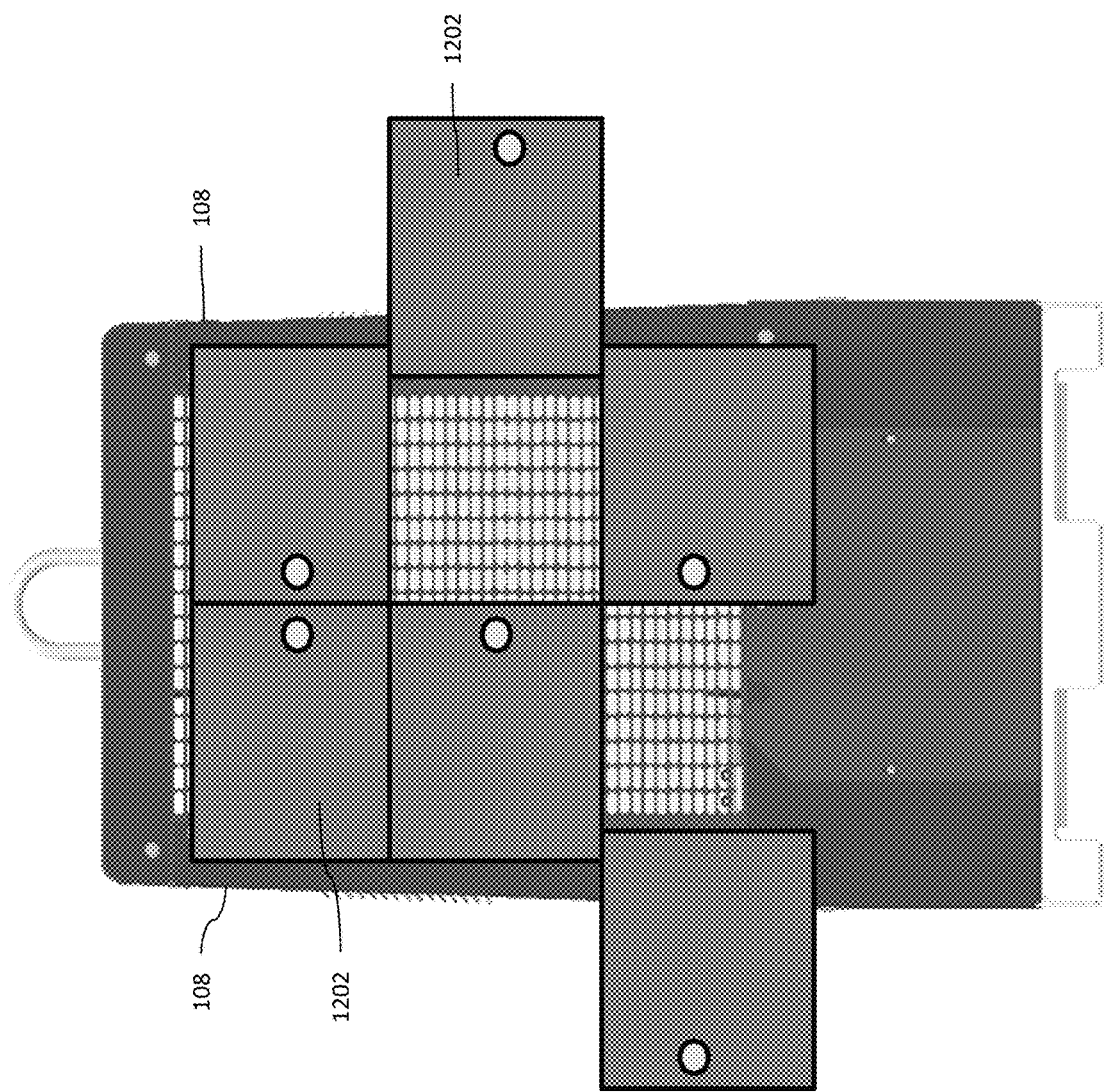

FIGS. 11a through 11c illustrate an alternative example power supply 1100. The alternative example power supply 1100 is very similar to the power supply 100. However, the power supply 1100 has a cover 1200 with door panels 1202 that are hinged so as to rotate outwards, towards the sidewalls 108, rather than upwards and/or downwards. In some examples, such as shown, for example, in FIG. 11c, the door panels 1202 may be further divided, to allow for more precise adjustment and/or control of air flow. Each door panel 1202 may be individually opened and/or closed, so as to transition the cover 1200 between fully open, partially open/closed, and/or fully closed positions and/or selectively alter and/or adjust the air flow through the ventilation opening 138 and/or ventilation grate 128. In some examples, the cover 1200 may comprise a folding sliding door, and/or a plurality of folding sliding doors, rather than hinged doors. In such an example, the cover 1202 may be configured to slidably move to expose portions of the ventilation opening 138 and/or ventilation grate 128.

Figure 12:
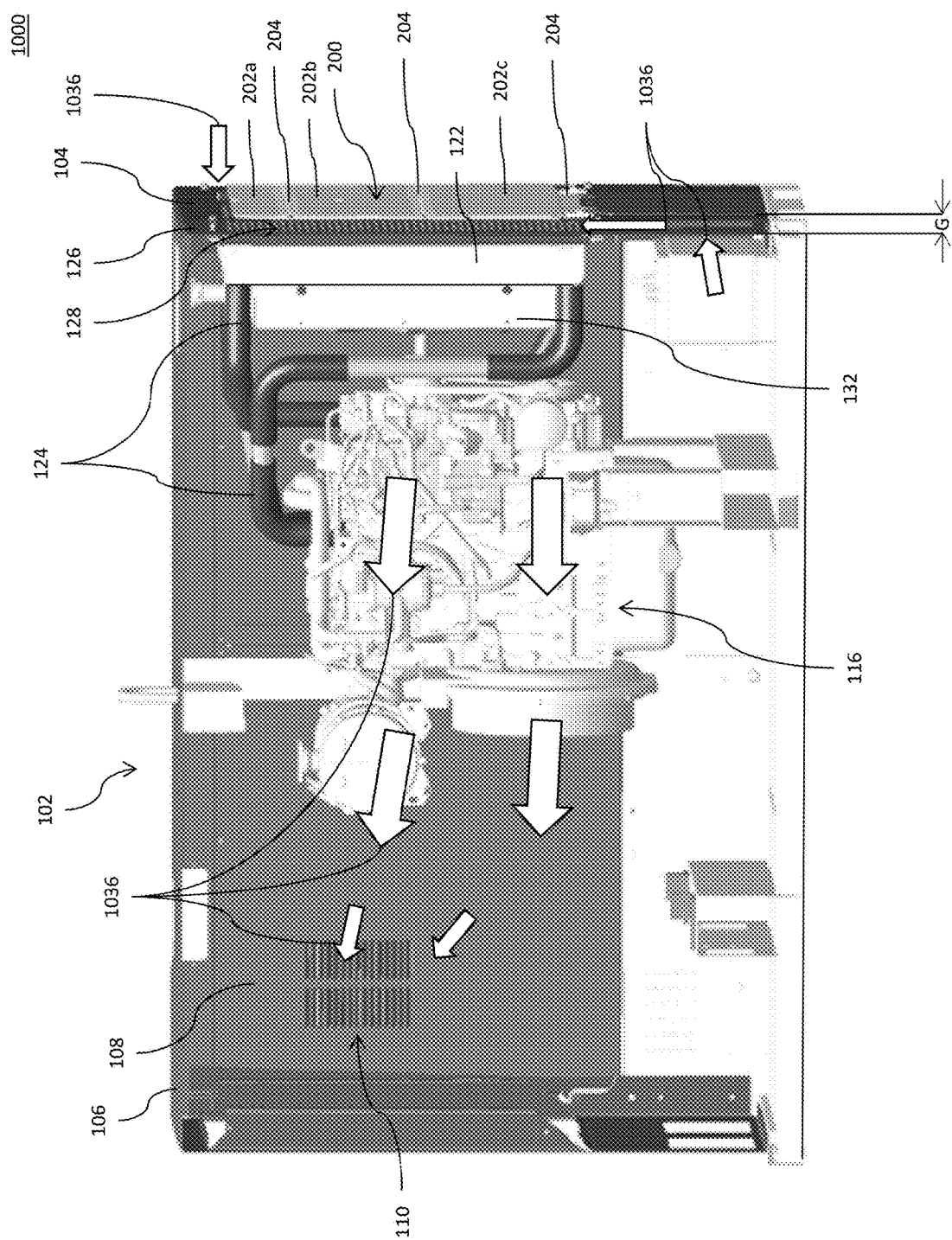
FIG. 12 is a side view of an alternative example welding power supply with a sidewall, front wall, generator, fuel tank, and welding circuitry removed.

FIG. 12 illustrates an alternative example welding power supply 1000. The welding power supply 1000 is similar to the welding power supply 100. However, in the welding power supply 1000, the direction of the airflow path 1036 is approximately opposite that of the airflow path 136 in the welding power supply 100.

The airflow path 1036 may exist between the louvers 110 (and/or other openings, apertures, holes, etc. (not shown)) integrated in the sidewall 108 (and/or top wall 106) of the enclosure 102 and the ventilation opening 138 in the rear wall 104 of the enclosure. However, the louvers 110 (and/or other openings, apertures, holes, etc. (not shown)) may serve as exhaust outlets rather than air intakes to the airflow path 1036. The airflow path 1036 may extend adjacent to the engine 116, through orifice 134 of the fan housing 132, through the porous radiator 122, and through the ventilation grate 128 and ventilation opening 138. The airflow path 1036 may allow for fluid communication between the engine 116, fan 130, radiator 122, ventilation grate 128, ventilation opening 138, and/or (depending on the position of the adjustable cover 200) the recirculation opening 127. The fan 130 may be configured to move air along the airflow path 1036 (albeit, in the approximately opposite direction of the airflow path 136). As the air moves along the airflow path 1036, it may be heated by the thermal energy created by and/or conducted through the welding power supply 1000 components (e.g. engine 116, radiator 122, charge air cooler, oil cooler, compressor, generator 114, weld circuitry 118, and/or other components). The propelled air may pick up heat from the welding power supply 100 components, and carry the heat with it as it flows through and/or out of the enclosure 102. However, the propelled air may move out of the enclosure 102 through the louvers 110 (and/or other openings, apertures, holes, etc. (not shown)) on the sidewalls 108, rather than out through the ventilation grate 128 and/or ventilation opening 138. The ventilation grate 128 and/or ventilation opening 138 may serve as inlets (rather than outlets) to the enclosure 102, allowing air to flow into the enclosure 102.

In operation of the welding power supply 1000, the adjustable cover 200 may block and/or obstruct air flow into the enclosure 102 through the ventilation grate 128 and/or ventilation opening 138. When blocked by the adjustable cover 200, the fan 130 may pull and/or suction air up through the recirculation opening 127 and/or gap G, thereby recirculating heated air. Thus, in colder conditions, for example, the cover 200 may be kept closed, causing warm air heated by the welding power supply 1000 components to be pulled and/or suctioned up through the recirculation opening 127 and/or gap G by the fan 130 and recirculated (and/or recycled) through the enclosure 102 along air flow path 1036. The cover 200 of the power supply 1000 may be adjusted as necessary to achieve an appropriate and/or desired level of ventilation and/or recirculation. In some examples, the louvers 110 (and/or other openings, apertures, holes, etc. (not shown)) may additionally, or alternatively, be partially and/or completely covered, obstructed, and/or blocked to achieve an appropriate and/or desired level of ventilation and/or recirculation, While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power supply, comprising:
   a generator;
   an engine operatively coupled to the generator;
   a radiator thermally coupled to the engine; and
   an enclosure that houses the generator, engine, and radiator, wherein the enclosure includes:
   a ventilation plate having a ventilation grate at a first end and a recirculation opening at a second end,
   a wall spaced from, and adjacent to, the ventilation plate, the wall having a ventilation opening in fluid communication with the radiator and the ventilation grate, and
   a cover attached to the wall, the cover being movable between a closed position in which the cover obstructs at least a portion of the ventilation opening, and an open position in which the cover does not obstruct a portion of the ventilation opening, wherein the cover is configured to recirculate air through the recirculation opening when the cover is in the closed position.

2. The welding power supply of claim 1, wherein the ventilation plate is spaced from the wall such that a gap exists between the cover and at least a portion of the ventilation plate when the cover is in the closed position.

3. The welding power supply of claim 2, wherein the cover is configured to substantially restrict air from leaving the enclosure through the ventilation grate, and redirect the air into the gap, when the cover is in the closed position.

4. The welding power supply of claim 3, wherein at least some of the air is recirculated through the recirculation opening via the gap when the cover is in the closed position.

5. The welding power supply of claim 1, wherein the cover includes a plurality of panels.

6. The welding power supply of claim 5, wherein the plurality of panels includes an upper panel, a middle panel, and a lower panel, and wherein the upper panel moves over the middle panel, and the middle panel moves over the lower panel, when the cover moves from a closed position to an open position.

7. The welding power supply of claim 6, wherein the top panel is hingedly attached to the middle panel, the middle panel is hingedly attached to the lower panel, and the lower panel is hingedly attached to the wall.

8. The welding power supply of claim 5, wherein the enclosure further includes a plurality of clips, the clips being toolessly movable between a secured position, where the clips secure the cover to the wall when the cover is in the closed position, and an unsecured position, where the clips do not secure the cover to the wall when the cover is in the closed position.

9. The welding power supply of claim 4, wherein the radiator is coupled to the ventilation plate.

10. The welding power supply of claim 9, further comprising a fan mounted within a fan housing, the fan housing being coupled to the radiator, and the fan configured to move air across the radiator and through the ventilation grate.

11. The welding power supply of claim 1, wherein at least a portion of the ventilation opening remains uncovered when the panels are in the closed position.

12. The welding power supply of claim 1, further including an actuation system that moves the cover between open and closed positions in response to a control signal from a controller.

13. The welding power supply of claim 12, further including a temperature sensor in electrical communication with the controller, wherein the controller is configured to send a control signal to the actuation system to trigger movement of the cover when the temperature sensor detects an ambient temperature at or within a predetermined threshold.

14. The welding power supply of claim 13, wherein the predetermined threshold is above 32 degrees Fahrenheit.

15. The welding power supply of claim 13, wherein the predetermined threshold is between 32 degrees Fahrenheit and 15 degree Fahrenheit, inclusive.

16. The welding power supply of claim 13, wherein the predetermined threshold is below 15 degrees Fahrenheit.

17. The welding power supply of claim 13, further including an interface configured to receive an input, wherein the predetermined threshold is set according to the input.

18. The welding power supply of claim 13, further including a transceiver configured to receive communication from an external device, wherein the predetermined threshold is set according to the received communication.

19. A power supply, comprising:
a generator;
an engine operatively coupled to the generator;
a radiator thermally coupled to the engine; and
an enclosure that houses the generator, engine, and radiator, wherein the enclosure includes:
a ventilation plate having a ventilation grate at a first end and a recirculation opening at a second end,
a wall spaced from, and adjacent to, the ventilation plate, the wall having a ventilation opening in fluid communication with the radiator and the ventilation grate, and
a cover attached to the wall, the cover being movable between a closed position in which the cover obstructs at least a portion of the ventilation opening, and an open position in which the cover does not obstruct a portion of the ventilation opening,
wherein the cover is configured to recirculate air through the recirculation opening when the cover is in the closed position.

* * * * *